United States Patent [19]
Miura et al.

[11] Patent Number: 5,552,945
[45] Date of Patent: Sep. 3, 1996

[54] TRANSDUCER RECALIBRATION SYSTEM AND METHOD FOR A ROTATING DISK DATA STORAGE

[75] Inventors: Tohru Miura; Hiroshi Tsuyuguchi, both of Tokyo, Japan

[73] Assignee: TEAC Corporation, Tokyo, Japan

[21] Appl. No.: 345,008

[22] Filed: Nov. 23, 1994

Related U.S. Application Data

[63] Continuation of Ser. No. 23,092, Feb. 26, 1993, abandoned.

[30] Foreign Application Priority Data

Mar. 2, 1992 [JP] Japan ..................................... 3-080486

[51] Int. Cl.$^6$ .................................................. G11B 5/596
[52] U.S. Cl. ..................................... 360/78.08; 360/78.13; 360/75
[58] Field of Search ............................. 360/78.13, 77.02, 360/78.08, 75; 318/685, 696

[56] References Cited

U.S. PATENT DOCUMENTS 4,594,620  6/1986  Shoji et al. ............................. 360/75
5,283,702  2/1994  Tsuyuguchi et al. ................. 360/77.02
5,303,107  4/1994  Miura et al. ............................. 360/137

*Primary Examiner*—Aristotelis Psitos
*Assistant Examiner*—Alan Faber
*Attorney, Agent, or Firm*—Woodcock Washburn Kurtz Mackiewicz & Norris

[57] ABSTRACT

A system for infallibly positioning a transducer on Track Zero on a flexible magnetic disk in the face of possible sensing errors by an optical Track Zero sensor customarily build into a disk drive. The transducer has not been correctly recalibrated if it has been positioned, when the disk drive is powered on, on an invalid track existing, either virtually or actually, immediately radially outwardly of Track Zero and if the disk drive is connected to a host that commands recalibration merely by causing transducer travel radially outwardly of the disk. A recalibration control circuit is therefore provided which cancels the host command and which, instead, causes the transducer to travel a predetermined distance radially inwardly of the disk and then to travel radially outwardly until the Track Zero sensor indicates again that the transducer is positioned on Track Zero.

6 Claims, 4 Drawing Sheets

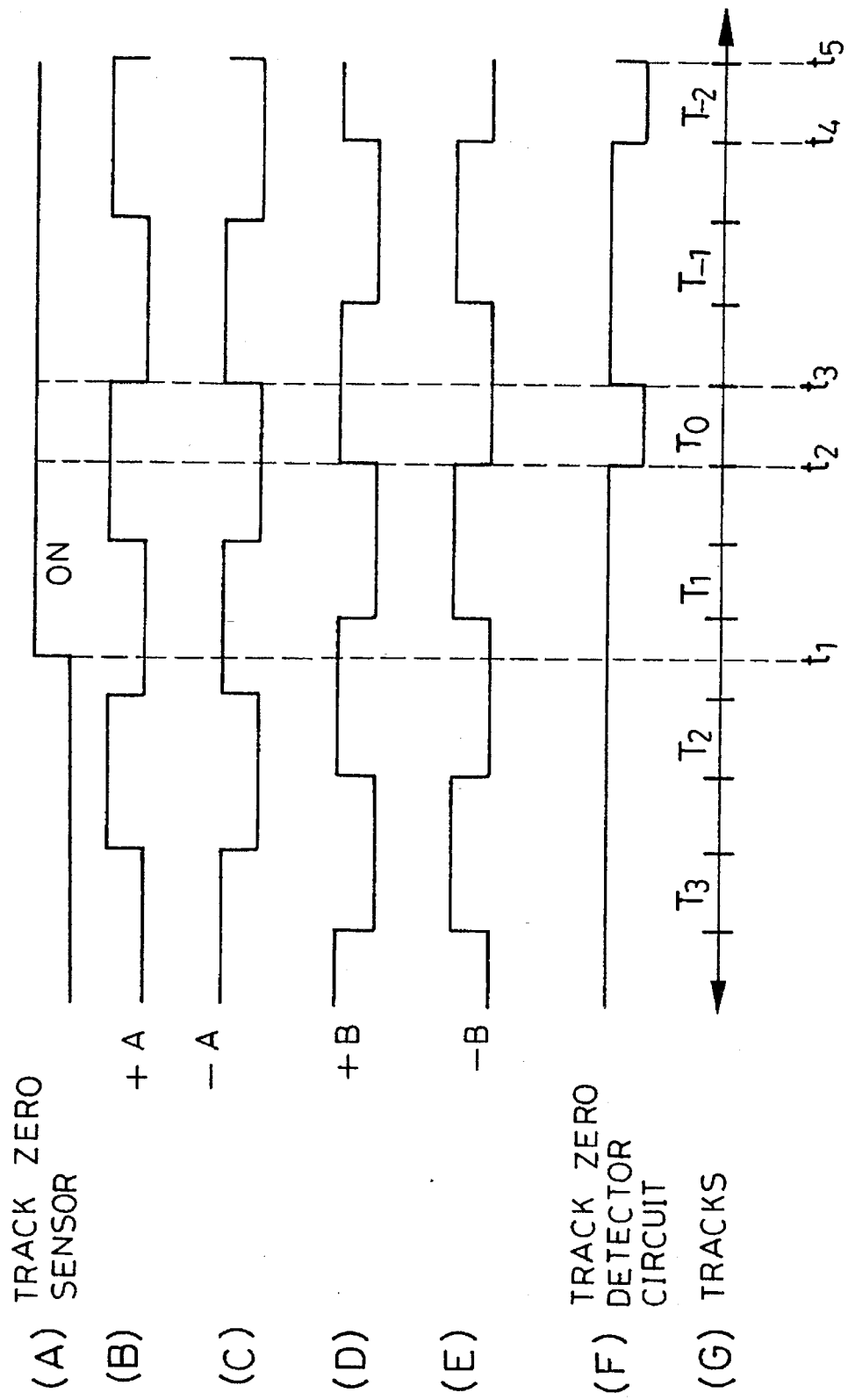

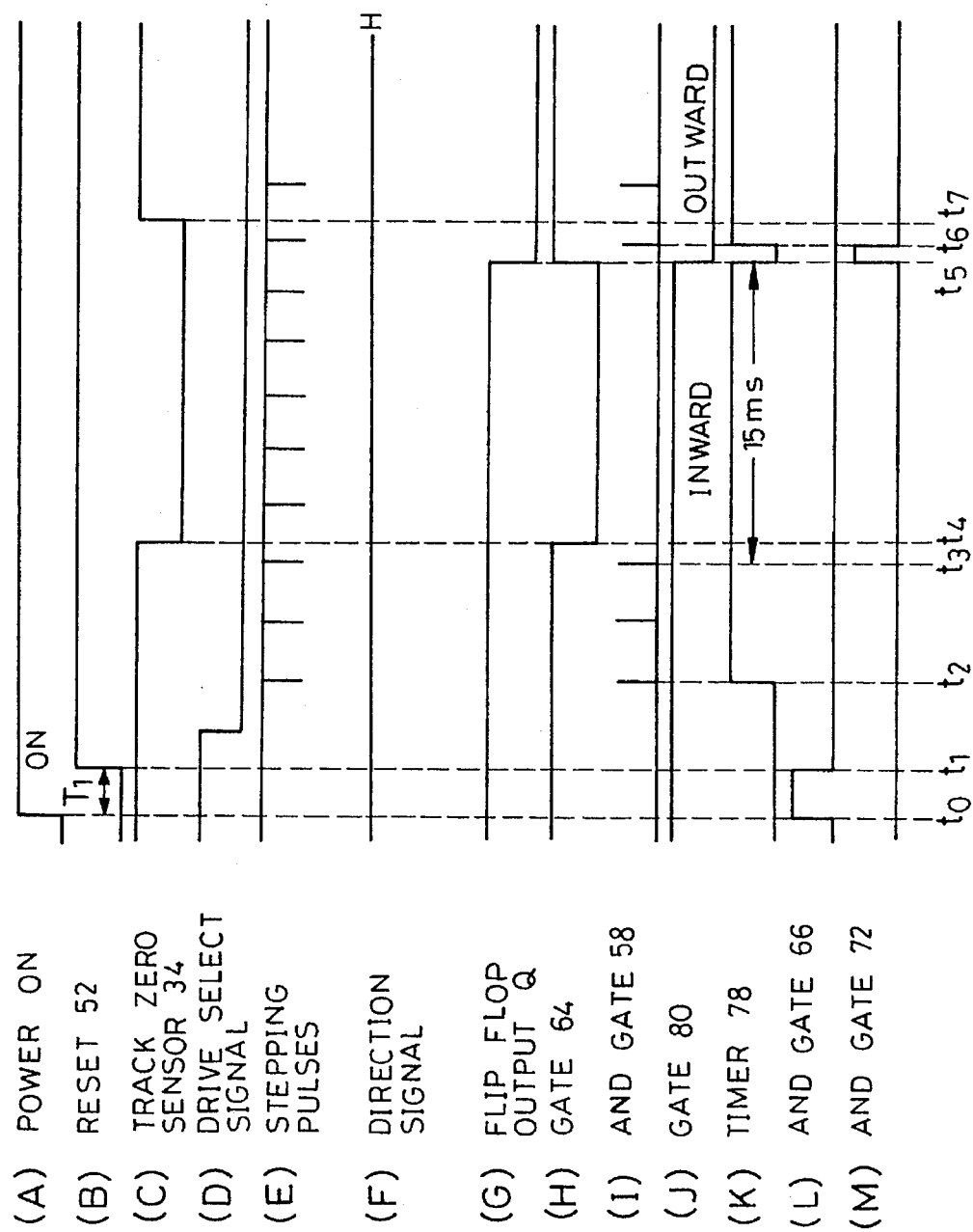

TRANSDUCER RECALIBRATION SYSTEM AND METHOD FOR A ROTATING DISK DATA STORAGE

This is a continuation of application Ser. No. 08/023,092, filed Feb. 26, 1993, now abandoned.

BACKGROUND OF THE INVENTION

This invention relates to an apparatus for data transfer with a rotating data storage disk such as a flexible magnetic disk having a multiplicity of annular tracks arranged concentrically thereon. More specifically, the invention deals with a system in such apparatus for automatically positioning a data transducer on a reference track, usually the outmost Track Zero, on the disk when the apparatus is electrically powered on.

In the rotating flexible magnetic disk apparatus, or disk drive according to more common parlance, the transducer must be recalibrated on Track Zero, or outermost valid track, on the disk when the apparatus is electrically turned on. Two schemes have been known and practiced for such recalibration. One is to incorporate a "power on" sensor circuit in the disk drive, causing the same to recalibrate the transducer independently of a host system with which the disk drive is interfaced. The other is to cause the disk drive to recalibrate the transducer under the direction of the host system.

The first scheme requires the disk drive to incorporate a recalibration circuit in addition to the "power on" sensor circuit. Consequently, when the complete data processing system, comprising the host and the disk drive or drives, is switched on, power is consumed immediately for recalibration purposes in addition to that for other working parts of the system. The total power requirement of the data processing system must therefore be rather inconveniently large.

The above inconvenience is absent from the second mentioned scheme because transducer recalibration under the control of the host takes place shortly after, rather than immediately when, the system is powered on. This second scheme has its own weakness, however. Disk drives are slave units which may be connected to hosts of various kinds made by various manufacturers. Some hosts are well calculated so that the transducer may be infallibly positioned on Track Zero after the system is switched on, no matter whatever position on the disk the transducer may have been in at that time.

There are, however, other, less sophisticated hosts that cause the stepper motor, which is included in the disk drive for track seek operation of the transducer, to be energized only in such a direction that the transducer travels radially outwardly of the disk when the system is switched on. The radially outward travel of the transducer is terminated when the disk drive signals the host that the transducer has arrived at Track Zero. A problem with this second known type of recalibration method is that the optical Track Zero sensor which is customarily built into the disk drive is inherently susceptible to sensing errors, possibly indicating that the transducer is on Track Zero when it is actually one or two tracks away in either direction from the reference track.

The problem will be better understood by considering the transducer recalibration system disclosed in U.S. Pat. No. 4,594,620 to Shoji et al. This prior art system determines that the transducer is on Track Zero when the Track Zero sensor puts out a signal to that effect, when the host supplies a signal commanding the radially outward travel of the transducer, and, at the same time, when the stepper motor has its predetermined sets of windings energized in a predetermined direction to position the transducer on Track Zero. The prior art system has proved unsatisfactory because the predetermined windings of the stepper motor are not necessarily energized in the predetermined direction only when the transducer is on Track Zero and because, as aforesaid, the Track Zero sensor is incapable of accurately sensing that the transducer is on the reference track.

Thus, according to the prior art, the host has been prone to be erroneously informed that the transducer is on Track Zero when it actually is not. Subsequent track seek operations of the transducer will of course be totally unsuccessful if it is not correctly recalibrated when the system is switched on.

SUMMARY OF THE INVENTION

The present invention seeks to realize, in a rotating disk data storage apparatus of the kind defined, more accurate recalibration than heretofore of the transducer on a reference track on the disk when the apparatus is switched on, no matter whichever type of host the apparatus may be put to use with.

Briefly, the invention is directed to an apparatus of the kind including a transducer for data transfer with a rotating data storage disk having a plurality of annular tracks arranged concentrically thereon, the tracks including a reference track and a plurality of valid tracks and a plurality of actual or virtual invalid tracks disposed on both sides of the reference track, transducer positioning means including a bidirectional stepper motor for moving the transducer across the tracks on the disk in a first direction, in which the transducer travels from the invalid toward the valid tracks, and in a second direction opposite to the first direction, first input means for inputting stepping pulses for causing the stepper motor to rotate by increments, second input means for inputting an externally generated stepping direction signal commanding the travel of the transducer in either of the first and the second directions, and a motor driver circuit for controllably driving the stepper motor in response to the stepping pulses and the stepping direction signal in order to position the transducer on any desired one of the reference track and the valid tracks on the disk.

More specifically, the invention concerns, in the apparatus of the kind outline above, a transducer recalibration system for automatically positioning the transducer on the reference track on the disk when the apparatus is electrically turned on. The transducer recalibration system comprises a reference track sensor for sensing whether the transducer is positioned approximately on the reference track or not, and a reference track detector circuit connected to the reference track sensor and the motor driver circuit and the second input means for determining that the transducer is on the reference track, when the reference track sensor indicates that the transducer is approximately positioned on the reference track, when the stepper motor is being so energized by the motor driver circuit as to position the transducer on the reference track, and, at the same time, when the external stepping direction signal commands transducer travel in the second direction. Also included in the recalibration system is a recalibration control circuit connected between the first and the second input means and the motor driver circuit, and to the reference track sensor, for inhibiting the delivery of the external stepping direction signal to the motor driver circuit when the apparatus is electrically turned on if then the external stepping direction signal commands transducer travel in the second direction and, at the same time, if then the reference track sensor indicates that the transducer is positioned approximately on the reference track, for supplying, instead, an internally stepping direction signal commanding transducer travel in the first direction to the motor driver circuit, thereby causing transducer travel in the first direction, and for permitting the delivery of the external stepping direction signal, commanding transducer travel in the second direction, from the second input means to the stepper motor control circuit, thereby causing transducer travel in the second direction, after the reference track sensor indicates that the transducer is no longer approximately positioned on the reference track as a result of the transducer travel in the first direction.

Assume that the reference track is Track Zero, with a multiplicity of valid data tracks disposed radially inwardly thereof and with some invalid tracks, either actual or virtual, disposed outwardly thereof. Heretofore, the transducer has not been correctly recalibrated if it has been positioned on the invalid track next to Track Zero when the system is switched on, and if the host is of the type that commands transducer travel only radially outwardly of the disk (second direction) for recalibration. This is because the Track Zero sensor indicates that the transducer is on Track Zero when it is on that invalid track and because the stepper motor is energized in the same way when the transducer subsequently travels to the next outer invalid track as when it is positioned on Track Zero.

Therefore, according to the invention, the transducer is first moved radially inwardly of the disk (first direction) past Track Zero until the Track Zero sensor indicates that it is no longer positioned on the reference track, in opposition to the stepping direction signal from the host commanding outward transducer travel. Then the transducer is moved outwardly until the reference track sensor indicates again that the transducer is on Track Zero. The signal thus produced by the sensor can be relied upon as a correct indication of the fact that the transducer has been recalibrated, regardless of whatever position the transducer may have been in on the disk when the system is switched on, and of the type of host with which the disk drive is interfaced.

The above and other features and advantages of this invention and the manner of realizing them will become more apparent, and the invention itself will best be understood, from a study of the following description and appended claims, with reference had to the attached drawings showing one preferred embodiment of the invention.

BRIEF DESCRIPTION OF THE DRAWINGS

FIG. 4, consisting of (A) through (G), is a timing chart explanatory of how the track zero detector, included in the disk drive of FIG. 1, determines that the transducer is on Track Zero; and FIG. 5, consisting of (A) through (M), is a series of waveform diagrams useful in explaining the operation of the transducer recalibration system of FIG. 1.

DESCRIPTION OF THE PREFERRED EMBODIMENT

Figure 1:
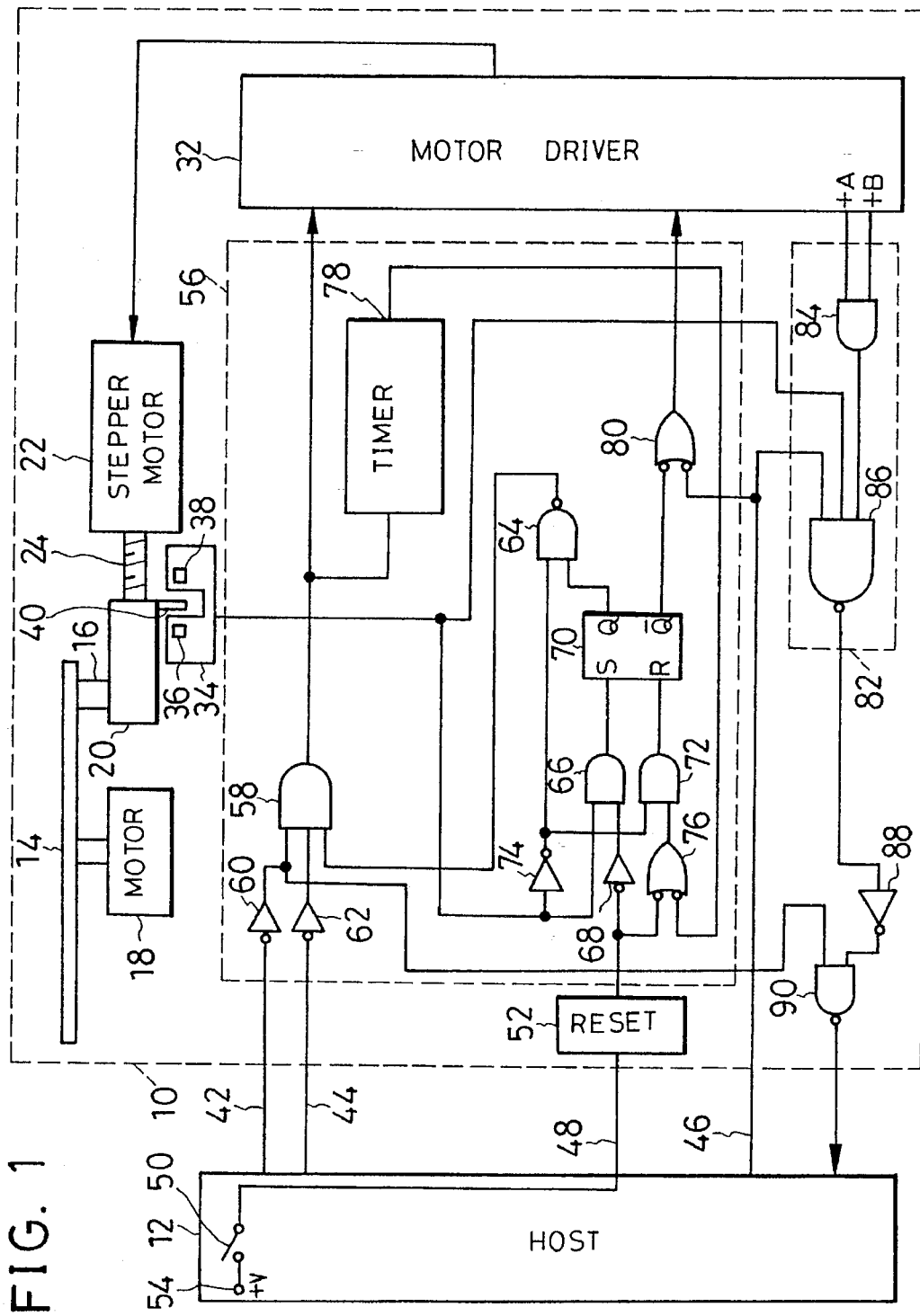
FIG. 1 is a block diagram of a flexible magnetic disk drive, shown together with a host system, embodying the transducer recalibration system embodying the invention.

The invention will now be described in detail as embodied in the flexible magnetic disk drive designated 10 in FIG. 1 and therein shown interfaced with a host system 12. The disk drive 10 is shown to have a flexible magnetic disk 14 replaceably mounted in position therein. It is understood for the convenience of disclosure that the disk 14 is single sided, having a multiplicity of annular tracks arranged concentrically on one of its major surfaces, as indicated at $T_o$, $T_1$, $T_2$. . . $T_n$ in FIG. 2. All these are valid tracks on which data can be written. The term "valid tracks" is used in contradistinction from invalid tracks $T_{-1}$, $T_{-2}$, . . . which exist, either virtually or actually, radially outwardly of the outmost valid track $T_o$. The outmost valid track $T_o$, Track Zero, is a reference track on which the transducer is to be positioned in accordance with the invention when the complete data processing system is electrically turned on.

With reference back to FIG. 1 the disk drive 10 has the transducer 16 for data transfer with the single sided magnetic disk 14 while the latter is being revolved by an electric disk drive motor 18. The transducer 16 is shown mounted to a carriage 20 for movement therewith across the tracks on the disk 14. An electric bidirectional stepper motor 22 is coupled to the carriage 20 via a lead screw 24 whereby the incremental rotation of the stepper motor is translated into the linear stepwise motion of the carriage, so that the transducer 16 can be positioned on any track on the disk 14.

Figure 3:
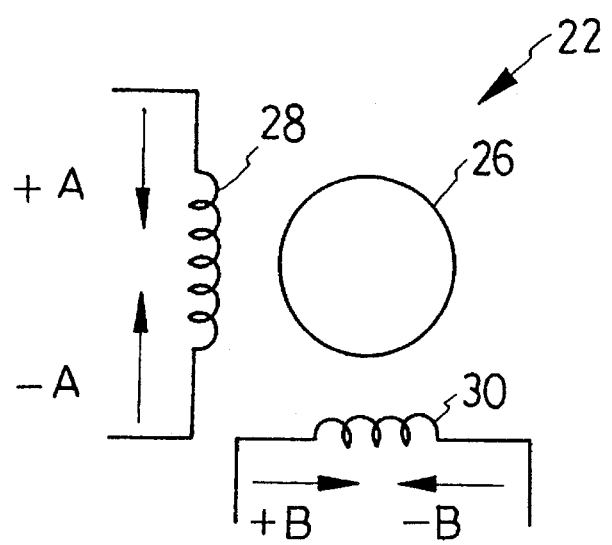
FIG. 3 is a schematic diagram of the stepper motor included in the disk drive of FIG. 1.

Preferably, the stepper motor 22 is of the known four phase, bi-polar design having a rotor 26 and two sets of stator windings 28 and 30, both as shown in FIG. 3. The stator windings are to be selectively and bidirectionally excited by a two phase motor driver circuit shown at 32 in FIG. 1.

Figure 2:
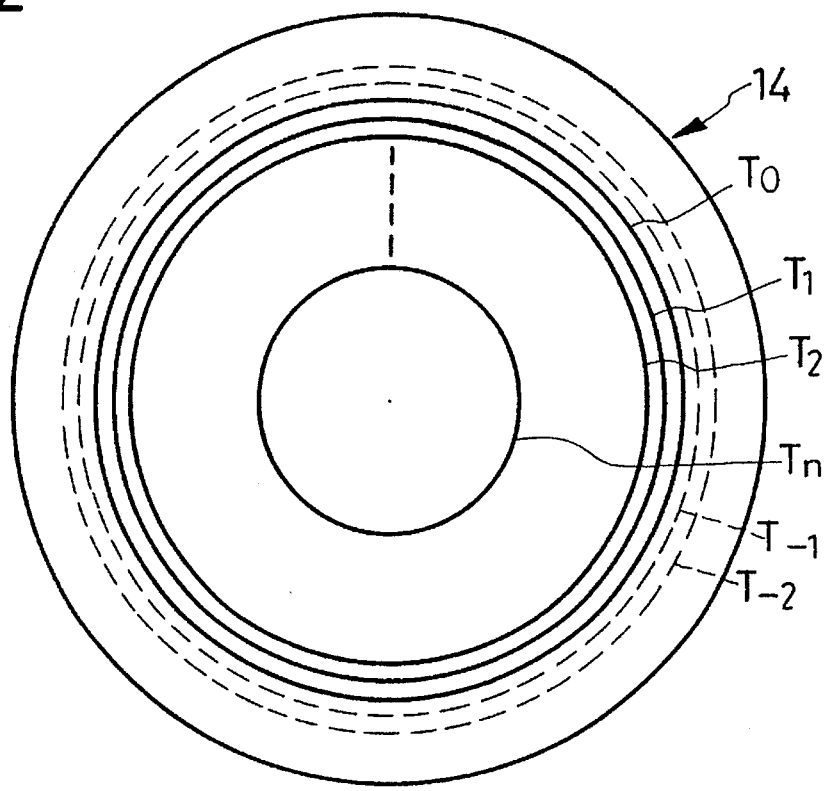
FIG. 2 is a plan view of a flexible magnetic disk for use with the disk drive of FIG. 1.

The reference numeral 34 in FIG. 1 generally denotes a Track Zero sensor for sensing whether or not the transducer 16 is on Track Zero $T_o$ on the disk 14. The Track Zero sensor 34 is of conventional make comprising a light source 36 and a photodetector 38 immovably disposed opposite each other across the path of an interrupter 40 mounted to the transducer carriage 20. Because of its very construction, however, the conventional Track Zero sensor 34 has sensing errors of approximately two tracks in each of the radially inward and outward directions of the disk. The output from this sensor is therefore taken as an indication of an approximate position of the transducer with respect to the reference track.

The host 12 is customarily coupled to the disk drive 10 via a drive select line 42, a stepping pulse line 44 and a stepping direction line 46. The drive select line 42 supplies a drive select signal which goes low when the illustrated disk drive 10, among other similar disk drives that may be connected to the host 12, is chosen for operation. The stepping pulse line 44 supplies "negative" stepping pulses for causing the incremental rotation of the stepper motor 22. The stepping direction line 46 supplies a stepping direction signal which is high for causing the stepper motor 22 to rotate in such a direction as to move the transducer 16 radially outwardly of the disk 14, and low for causing the stepper motor 22 to rotate in the other direction for moving the transducer radially inwardly of the disk.

Another line 48 connects a power switch 50 in the host 12 to a reset signal generator circuit 52 in the disk drive 10. The power switch 50 is connected to a supply terminal 54 in the host 12. It is understood that the supply terminal 54 is connected to various working parts of the disk drive 10 and the host 12 via the power switch 50.

Heretofore, the stepping pulse line 44 and the stepping direction line 46 were both connected substantially directly to the motor driver circuit 32. By contrast, according to the invention, the lines 44 and 46 are connected thereto via a recalibration control circuit 56, which forms the gist of this invention, for infallibly positioning the transducer on the reference track on the disk 14 upon closure of the power switch 50, regardless of whichever of the noted two recalibration schemes may be built into the host 12.

Included in the recalibration control circuit 56 is a three inputs AND gate 58 having a first input connected to the drive select line 42 via a NOT circuit 60, a second input connected to the stepping pulse line 44 via another NOT circuit 62, and a third input connected to a NAND gate 64. The output of the AND gate 58 is connected to the motor driver circuit 32. Thus the AND gate 58 permits the inverted stepping pulses to pass therethrough on to the motor driver circuit 32 only when the drive select signal on the line 42 is low and, at the same time, when the output from the NAND gate 64 is high.

Another AND gate 66 in the recalibration control circuit 56 has two inputs, one connected directly to the Track Zero sensor 34, and the other to the reset signal generator circuit 52 via a NOT circuit 68. The output of the AND gate 66 is connected to the set input S of an RS flip flop 70.

Still another AND gate 72 in the recalibration control circuit 56 also has two inputs, one connected to the Track Zero sensor 34 via a NOT circuit 74, and the other to an OR type NAND gate 76. The output of the AND gate 72 is connected to the reset input R of the flip flop 70. The NAND gate 76 has a first input connected to the reset signal generator circuit 52, and a second input connected to a timer 78. The NAND gate 64 has a first input connected to the Track Zero sensor 34 via the NOT circuit 74, and a second input connected to the noninverting output Q of the flip flop 70. The inverting output of the flip flop 70 is connected to a first input of another OR type NAND gate 80, a second input of which is connected to the stepping direction line 46. The output of the NAND gate 80 is connected to the motor driver circuit 32.

The timer 78 takes the form of a retriggerable monostable multivibrator, going high in response to each inverted stepping pulse that has traveled through the AND gate 58, and remaining so as long as the inverted stepping pulses are supplied at regular intervals. The timer 78 goes low when the supply of the pulses is suspended for a preassigned length of time.

The disk drive 10 further includes an electronic Track Zero detector circuit 82 for determining that the transducer 16 is on Track Zero, on the bases of the output from the optical Track Zero sensor 34, the signals being applied to the stepper motor 22, and the stepping direction signal on the line 46. The Track Zero detector circuit 82 comprises an AND gate 84 and a HAND gate 86. The AND gate 84 has its two inputs connected respectively to the positive A and B phase signal terminals of the four phase, two phase drive stepper motor 22 which are provided within the motor driver circuit 32. It is understood that both +A and +B phase windings of the stepper motor 22 are energized when the transducer is on Track Zero. The NAND gate 86 has a first input connected to the stepping direction line 46, a second input to the Track Zero sensor 34, and a third input to the AND gate 84.

The output of the NAND gate 86, or of the Track Zero detector circuit 82, is connected to the host 12 via a NOT circuit 88 and a HAND gate 90, which HAND gate has its other input connected to the NOT circuit 60. The output from the Track Zero detector circuit 82 is therefore supplied to the host 12 only when the drive select signal on the line 42 is low.

FIG. 4 is explanatory of how the Track Zero detector circuit 82 determines that the transducer 16 is on Track Zero on the disk 14. At (A) in FIG. 4 is shown the optical Track Zero sensor to go high at time $t_1$. Because of its unavoidable sensing errors, however, the transducer may not then be on Track Zero even if the stepping direction signal on the line 46 is high, commanding the travel of the transducer radially outwardly of the disk. However, as has been stated, the +A and +B phase windings of the stepper motor 22 are both invariably energized when the transducer is on Track Zero, as will be understood from (B) through (E) in FIG. 4 taken together with FIG. 3. Consequently, the AND gate 84 of the Track Zero detector circuit 82 is high from $t_2$ to $t_3$ in FIG. 4. The three inputs to the NAND gate 86 are all high during this time interval, so that its output is low as at (F) in FIG. 4, indicating the completion of transducer recalibration.

Let it be assumed that the disk drive were of conventional make, having no recalibration control circuit 56 forming the gist of this invention. In that case the above low output from the Track Zero detector circuit 82 would be reliable as a correct indication of the fact that the transducer was on Track Zero, if the host 12 was of the first known type, but unreliable if the host was of the second known type. For transducer recalibration the first type of host commands transducer travel radially inwardly of the disk over a distance not less than the sensing error (two tracks) of the Track Zero sensor 34, followed by transducer travel radially outwardly of the disk to Track Zero, when the system is powered on. The second type of host commands transducer travel only radially outwardly of the disk. The reasons for this unreliability of the Track Zero detector circuit with the second type of host, and for its reliability with the first type of host, will be discussed in the following, with reference directed also to FIG. 4.

The trouble with the second type of host arises in the case where the transducer is on the first invalid track $T_{-1}$, lying immediately outwardly of Track Zero $T_o$, when the system is switched on. Were it not for the recalibration control circuit 56, the transducer would then move to the second invalid track $T_{-2}$ in response to the recalibration command from the second type of host. As will be noted from FIG. 4, both +A and +B phase windings of the stepper motor are simultaneously energized when the transducer is on this second invalid track $T_{-2}$, too. The Track Zero detector circuit 82 would then put out a wrong signal indicating that the transducer was on Track Zero.

No such trouble will occur if the host is of the first type, regardless of the presence or absence of the recalibration control circuit 56. The transducer will then first travel from the first invalid track $T_{-1}$ radially inwardly of the disk past Track Zero and then radially outwardly of the disk until it is positioned on the reference track. The recalibration control circuit 56 according to the invention is intended to make the Track Zero detector circuit 82 as reliable with the second type of host as it is with the first type. The following is the description of how the transducer is correctly recalibrated on Track Zero upon closure of the power switch 50 even if the host 12 is of the second type.

At (A) in FIG. 5 is shown the power switch 50 closed at time $t_o$. The reset signal generator circuit 52 will go high at a time $t_1$ upon lapse of a predetermined period $T_1$ from the time $t_o$, as at (B) in FIG. 5. The Track Zero sensor 34 is now assumed to be high, as at (C) in FIG. 5, indicating that the transducer is on Track Zero, although actually it may not be because of its inherent sensing errors. Both inputs to the AND gate 66 of the recalibration control circuit 56 are high during this $t_o$–$t_1$ time interval, as at (L) in FIG. 5. The high output from the AND gate 66 is impressed to the set input S of the flip flop 70 thereby making its inverting output low. This low output from the flip flop 70 is delivered to the NAND gate 80, which has its other input connected to the stepping direction line 46.

If the host 12 is of the second known type set forth with reference to FIG. 4, the stepping direction signal on the line 46 will now be high, as at (F) in FIG. 5, commanding transducer travel radially outwardly of the disk. In disk drives of prior art construction, having no recalibration control circuit 56, the high stepping direction signal was inverted by a NOT circuit prior to application to the stepper motor driver circuit 32, and this driver circuit responded to the inversion of the high stepping direction signal by causing the transducer 16 to travel radially outwardly of the disk 14.

Contrastingly, in the disk drive 10 according to the invention, the high stepping direction signal is applied to the NAND gate 80. The other input to this NAND gate is low, as set forth above. The resulting output from the NAND gate 80, which output may be termed an internally generated stepping direction signal, is high, commanding transducer travel radially inwardly of the disk in the face of the high state of the external stepping direction signal from the host 12.

For actual transducer travel radially inwardly of the disk, stepping pulses shown at (E) in FIG. 5 must be applied from host 12 to motor driver circuit 32 via the recalibration control circuit 56. The stepping pulse line 44 is connected via the NOT circuit 62 to the three input AND gate 58, so that the other two inputs to this AND gate must be both high in order to enable the passage of the stepping pulses therethrough. The drive select signal on the line 42 is shown at (D) in FIG. 5 to go low very shortly after the time $_1$, commanding the operation of this disk drive 10. Inverted by the NOT circuit 60, the drive select signal is applied to one other input of the AND gate 58. The NAND gate 64, connected to the remaining one input of the AND gate 58, is high until time $t_4$, as at (H) in FIG. 5, since the Track Zero sensor 34 has been assumed to be high as at (C) in FIG. 5.

Thus, after being inverted by the NOT circuit 62, the stepping pulses will pass through the AND gate 58, as at (I) in FIG. 5. Inputting both the stepping pulses from the AND gate 58 and the internal stepping direction signal from the NAND gate 80, the stepper motor control circuit 32 will conventionally drive the stepper motor 22 so as to cause the transducer 16 to travel radially inwardly of the disk 14. The Track Zero sensor 34 will go low at time $t_4$, as at (C) in FIG. 5, signaling that the transducer is no longer positioned on Track Zero, when the transducer travels a predetermined number (e.g. three) of tracks inwardly from the track (e.g. invalid track $T_{-1}$) on which it has been positioned when the system is powered on.

The transducer must now be stepped outwardly of the disk to Track Zero. In the illustrated embodiment, however, the outward travel of the transducer is inhibited a predetermined period of, say, approximately 15 milliseconds after the time $t_4$ despite the continued delivery of the stepping pulses from the host 12, as at (E) in FIG. 5, in order to allow for the required reversion of the rotational direction of the stepper motor 22. Such inhibition of outward transducer travel is accomplished as both inputs to the NAND gate 64 become high, making its output go low as at (H) in FIG. 5, when the Track Zero sensor 34 goes low at the time $t_4$. The low output from the NAND gate 64 inhibits the passage of the stepping pulses through the AND gate 58.

It is the timer 78 that functions to permit the resumption of delivery of stepping pulses to the motor driver circuit 32 upon lapse of approximately 15 milliseconds from the time $t_4$. Comprising a retriggerable monostable multivibrator, the timer 78 is constantly retriggered by the inverted stepping pulses, and so remains high, as long as they are supplied at their predetermined time spacings. However, as the AND gate 58 discontinues the production of the stepping pulses at the time $t_3$, as at (I) in FIG. 5, the timer 78 will go low at time $t_5$, as at (K) in FIG. 5, upon lapse of 15 milliseconds from the time $t_3$. Alternatively, the timer 78 could be made to go low exactly 15 milliseconds from the time $t_4$ in response to the output from the Track Zero sensor 34.

The OR type NAND gate 76 will go high when the timer 78 goes low at the time $t_5$, with the result that the AND gate 72 goes high, as at (M) in FIG. 5. The high output from the AND gate 72 will cause the Q output of the flip flop 70 to go low, as at (G) in FIG. 5. Thus the NAND gate 64 will go high at the time $t_5$, as at (H) in FIG. 5. The high output from the NAND ate 64 will permit the passage of the inverted stepping pulses through the AND gate 58 on to the motor driver circuit 32. Also, at the time $t_5$, the NAND gate 80 will go low, as at (J) in FIG. 5, since the external stepping direction signal on the line 46 is still high as at (F) in FIG. 5. The low output from the NAND gate 80 dictates the travel of the transducer radially outwardly of the disk in accordance with the high state of the external stepping direction signal.

Inputting both stepping pulses and stepping direction signal, the motor driver circuit 32 will again conventionally function to cause transducer travel radially outwardly of the disk. The Track Zero sensor 34 will subsequently go high as at time $t_7$ when the transducer is positioned on Track Zero or thereabouts. The Track Zero detector circuit 82 will then put out a signal correctly indicating that the transducer is on Track Zero, when both +A and +B phase windings of the stepper motor 22 are subsequently excited simultaneously.

Possibly, contrary to the showing of FIG. 5, the transducer may be so far away from Track Zero that the output from the Track Zero sensor 34 may be low, when the system is switched on. The AND gate 66 will remain low in this case; instead, the other AND gate 72 will go high. Consequently, the flip flop 70 will be reset by the high output from the AND gate 72 instead of being set by the AND gate 66. The transducer will therefore be recalibrated through the same procedure as in conventional disk drives having no recalibration control circuit.

Although the present invention has been shown and described in the foregoing in very specific aspects thereof, it is not desired that the invention be limited by the exact details of such disclosure. The following, then, is a brief list of possible modifications and alterations of the illustrated embodiment which are all believed to fall within the scope of this invention:

1. The AND gates 66 and 72 could be replaced by NAND gates, so that the flip flop 70 might be triggered by negative pulses.

2. The flip flop 70 could be of other than the RS type.

3. The NAND gate 80 could be replaced by an OR gate, with one input connected to the stepping direction line 46 via a NOT circuit, and the other input to the noninverting output Q of the flip flop 64.

4. The Track Zero sensor 34 could be constituted of a Micro-switch (trade name) or other equivalent means.

What is claimed is:

1. In an apparatus having a transducer for data transfer with a rotating data storage disk having a plurality of annular tracks arranged concentrically thereon, the tracks including a reference track and a plurality of valid tracks and a plurality of actual or virtual invalid tracks disposed on both sides of the reference track, transducer positioning means including a bi-directional stepper motor for moving the transducer across the tracks on the disk in a first direction, in which the transducer travels from the invalid toward the valid tracks, and in a second direction opposite to the first direction, first input means for inputting stepping pulses for causing the stepper motor to rotate by increments, second input means for inputting an externally generated stepping direction signal commanding the travel of the transducer in either of the first and the second directions, and a motor driver circuit for controllably driving the stepper motor in response to the stepping pulses and the stepping direction signal in order to position the transducer on any desired one of the reference track and the valid tracks on the disk, a transducer recalibration system for automatically positioning the transducer on the reference track on the disk when the apparatus is electrically turned on, the transducer recalibration system comprising:

(a) a reference track sensor for sensing whether the transducer is positioned approximately on the reference track or not;

(b) a reference track detector circuit connected to the reference track sensor and the motor driver circuit and the second input means for determining that the transducer is on the reference track, when the reference track sensor indicates that the transducer is approximately positioned on the reference track, when the stepper motor is being so energized by the motor driver circuit as to position the transducer on the reference track, and, at the same time, when the external stepping direction signal commands transducer travel in the second direction; and (c) signal producing means for producing a signal representative of the fact that the apparatus is electrically turned on;

d) a recalibration control circuit connected between the first and the second input means and the motor driver circuit, and to the reference track sensor and the signal producing means, for inhibiting the delivery of the external stepping direction signal to the motor driver circuit when the apparatus is electrically turned on if then the external stepping direction signal commands transducer travel in the second direction and, at the same time, if then the reference track sensor indicates that the transducer is positioned approximately on the reference track, for supplying, instead, an internally generated stepping direction signal commanding transducer travel in the first direction to the motor driver circuit, thereby causing transducer travel in the first direction, and for permitting the delivery of the external stepping direction signal, commanding transducer travel in the second direction, from the second input means to the stepper motor control circuit, thereby causing transducer travel in the second direction, after the reference track sensor indicates that the transducer is no longer approximately positioned on the reference track as a result of the transducer travel in the first direction;

e) whereby, when the reference track sensor subsequently indicates that the transducer is approximately positioned on the reference track as a result of the transducer travel in the second direction, the reference track detector circuit correctly determines that the transducer is on the reference track, even if the transducer has been positioned on one of the invalid tracks on the disk when the apparatus is electrically turned on.

2. The invention of claim 1 wherein the recalibration control circuit further comprises means for inhibiting the rotation of the stepper motor for a preassigned length of time after the transducer has traveled in the first direction and before the transducer starts traveling in the second direction.

3. The invention of claim 1 wherein the recalibration control circuit comprises:

(a) a reset circuit for producing a reset signal upon lapse of a preassigned time after the apparatus is electrically turned on;

(b) first circuit means connected to the reference track sensor and the reset circuit for providing a signal indicating that the transducer is approximately positioned on the reference track when the apparatus is electrically turned on;

(c) second circuit means connected to the reference track sensor for providing a signal indicating that the transducer is not approximately positioned on the reference track;

(d) third circuit means connected to the first and the second circuit means for providing a signal indicative of a period of time from the moment the apparatus is electrically turned on to the moment the reference track sensor indicates that the transducer is not approximately positioned on the reference track; and (e) fourth circuit means having inputs connected to the second input means and the third circuit means, and an output connected to the motor driver circuit, for supplying to the motor driver circuit the internally generated stepping direction signal commanding transducer travel in the first direction as long as the external stepping direction signal commands transducer travel in the second direction during the period of time indicated by the signal provided by the third circuit means.

4. The invention of claim 3 wherein the recalibration control circuit further comprises:

(a) fifth circuit means connected between the first input means and the motor control circuit for on-off control of the stepping pulses from the former to the latter;

(b) sixth circuit means having inputs connected to the reference track sensor and the third circuit means, and an output connected to the fifth circuit means, for inhibiting the passage of the stepping pulses through the fifth circuit means when the reference track sensor indicates that the transducer is no longer approximately positioned on the reference track during the period of time indicated by the signal provided by the third circuit means; and (c) a timer circuit connected to the fifth circuit means for permitting the passage of the stepping pulses therethrough upon lapse of a preassigned length of time following the inhibition of the passage of the stepping pulses through the fifth circuit means by the sixth circuit means.

5. The invention of claim 4 wherein the time circuit comprises a monostable multivibrator connected between an output of the fifth circuit means and an input of the second circuit means.

6. A method for positioning a transducer on a reference track on a disk in an apparatus having the transducer for data transfer with the rotating data storage disk having a plurality of annular tracks arranged concentrically thereon, the tracks including the reference track and a plurality of valid tracks and a plurality of actual or virtual invalid tracks disposed on both sides of the reference track, transducer positioning means including a bidirectional stepper motor for moving the transducer across the tracks on the disk in a first direction, in which the transducer travels from the invalid toward the valid tracks, and in a second direction opposite to the first direction, first input means for inputting stepping pulses for causing the stepper motor to rotate by increments, second input means for inputting an externally generated stepping direction signal commanding the travel of the transducer in either of the first and the second directions, a motor driver circuit for controllably driving the stepper motor in response to the stepping pulses and the stepping direction signal in order to position the transducer on any desired one of the reference track and the valid tracks on the disk, and a transducer recalibration system for automatically positioning the transducer on the reference track on the disk when the apparatus is electrically turned on, the transducer recalibration system comprising a reference track sensor for sensing whether the transducer is positioned approximately on the reference track or not, and a reference track detector circuit connected to the reference track sensor and the motor driver circuit and the second input means for determining whether the transducer is on the reference track when the reference track sensor indicates that the transducer is approximately positioned on the reference track, the stepper motor is being so energized by the motor driver circuit as to position the transducer on the reference track, and, at the same time, the external stepping direction signal commands transducer travel in the second direction, the method comprising the steps of:

(a) inhibiting the delivery of the external stepping direction signal to the motor driver circuit when the apparatus is electrically turned on, the external stepping direction signal commands transducer travel in the second direction and, at the same time, the reference track sensor indicates that the transducer is positioned approximately on the reference track;

(b) supplying, instead, an internally generated stepping direction signal commanding transducer travel in the first direction to the motor driver circuit, thereby causing transducer travel in the first direction; and (c) permitting the delivery of the external stepping direction signal, commanding transducer travel in the second direction, from the second input means to the stepper motor control circuit, thereby causing transducer travel in the second direction, after the reference track sensor indicates that the transducer is no longer approximately positioned on the reference track as a result of the transducer travel in the first direction, whereby, when the reference track sensor subsequently indicates that the transducer is approximately positioned on the reference track as a result of the transducer travel in the second direction, the reference track detector circuit correctly determines that the transducer is on the reference track, even if the transducer has been positioned on one of the invalid tracks on the disk when the apparatus is electrically turned on.

* * * * *

UNITED STATES PATENT AND TRADEMARK OFFICE
CERTIFICATE OF CORRECTION

PATENT NO. : 5,552,945
DATED : September 3, 1996
INVENTOR(S) : Miura, et. al.

It is certified that error appears in the above-indentified patent and that said Letters Patent is hereby corrected as shown below:

Title page, item [54] and col. 1, lines 1-2, should read --Transducer Recalibration System and Method for a Rotating Disk Data Storage--.

Column 3, Line 5, after "internally" add --generated--.

Column 5, Line 55, after "a" change "HAND" to --NAND--.

Column 5, Line 67, after "a" change "HAND" to --NAND-- and after "which" change "HAND" to --NAND--.

Column 7, Line 39, after "time" change "$_1$," to --$t_1$,--.

Signed and Sealed this

Eleventh Day of February, 1997

Attest:

BRUCE LEHMAN

Attesting Officer       Commissioner of Patents and Trademarks